(12) United States Patent
Guzikevits et al.

(10) Patent No.: US 6,628,664 B1
(45) Date of Patent: Sep. 30, 2003

(54) APPARATUS AND METHOD FOR DIGITAL TELEPHONY

(75) Inventors: Zuri Guzikevits, Tel Aviv (IL); Joshua Piasecki, Ramat Gan (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/237,300

(22) Filed: Jan. 25, 1999

(30) Foreign Application Priority Data

Jan. 25, 1998 (IL) .................................................. 123045

(51) Int. Cl.[7] .................................................. H04J 3/22
(52) U.S. Cl. ...................................... 370/465; 375/222
(58) Field of Search .............................. 375/214, 220, 375/222, 295, 316, 354, 355, 356, 371, 372; 370/465

(56) References Cited

U.S. PATENT DOCUMENTS

| 5,034,962 | A | | 7/1991 | Yamamoto et al. ............. 375/8 |
|---|---|---|---|---|
| 5,040,190 | A | * | 8/1991 | Smith et al. ................. 370/463 |
| 5,121,391 | A | * | 6/1992 | Paneth et al. ................ 370/286 |
| 5,384,806 | A | | 1/1995 | Agazzi .......................... 375/8 |
| 5,394,437 | A | | 2/1995 | Ayanoglu et al. ............ 375/222 |
| 5,629,931 | A | * | 5/1997 | Kausel ........................ 370/241 |
| 6,233,284 | B1 | * | 5/2001 | Townshend ................. 375/242 |

FOREIGN PATENT DOCUMENTS

| EP | 0 642 238 | 3/1995 |
|---|---|---|
| WO | WO 96/41441 | 12/1996 |

OTHER PUBLICATIONS

Pahlavan K. et al., "A Method to Counteract the Effects of PCM Systems on the Performance of Ultra High Speed Voice–Band Modems", IEEE: International Solid–State Circuits Conference, vol. 3, No. 9, Jun. 1986, pp. 1592–1596.

* cited by examiner

Primary Examiner—Chi Pham
Assistant Examiner—Pankaj Kumar
(74) Attorney, Agent, or Firm—Nath & Associates PLLC; Harold L. Novick; Marvin C. Berkowitz

(57) ABSTRACT

A telecommunications system including an at least partially digital telephone link having an analog end portion, first and second modems disposed along the link, and analog/digital devices disposed along the link intermediate the modems which are operative to support communications between the first and second modems substantially at bit rates in excess of 28.8 Kbps.

9 Claims, 6 Drawing Sheets

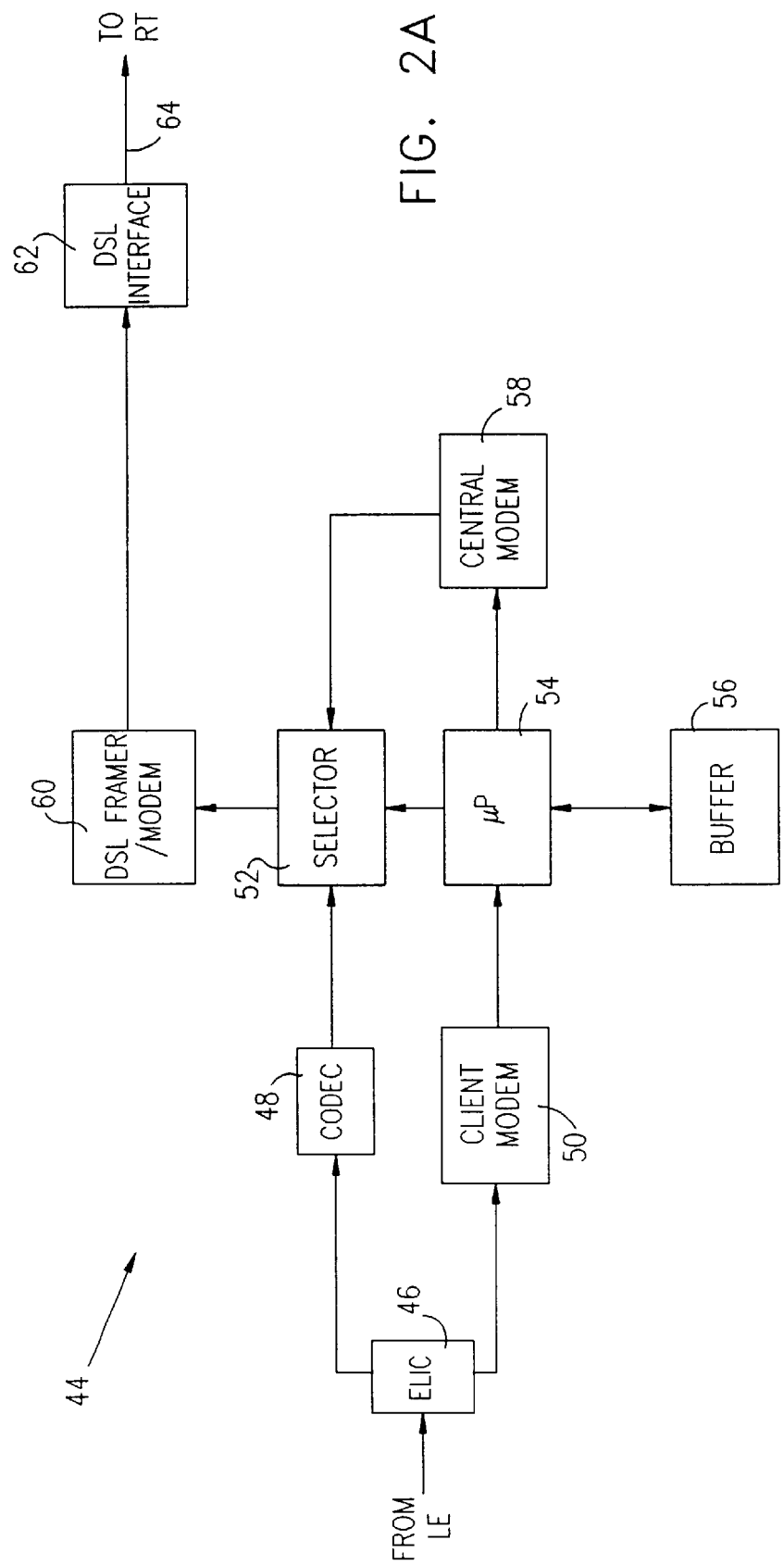

APPARATUS AND METHOD FOR DIGITAL TELEPHONY

FIELD OF THE INVENTION

The present invention relates to telephony in general, and in particular to apparatus and methods for transferring a high-speed voice-band data modem signal over telephone networks that incorporate equipment such as multiplexers and pair gain apparatus between the central office and the subscriber.

BACKGROUND OF THE INVENTION

Digital data is typically transmitted between the central office (CO) and the subscriber by converting the data to analog form suitable for band-pass transmission over POTS lines. Since all modern CO switches are digital, they perform a digital to analog (D/A) conversion on downstream data transmitted to the subscriber and analog to digital (A/D) conversion on upstream data received from the subscriber.

Transmission equipment such as multiplexers or pair gain devices installed between the CO and the subscriber usually require at least two additional conversions per one-way transmission. In a downstream transmission an A/D conversion is performed on transmissions received from the CO, typically at a central office terminal (COT), and a D/A conversion is performed on transmissions to the subscriber, typically at a remote terminal (RT). Upstream transmissions likewise usually require at least two additional conversions.

These additional conversions often degrade the transmission line quality thereby interfering with the operation of high-speed modems such as 56k pulse amplitude modulation modems such that it is often impossible to transmit data above 28,800 Kbps where such transmission equipment is used.

SUMMARY OF THE INVENTION

The present invention seeks to provide novel apparatus and methods for transferring a high-speed voice-band data modem signal over telephone networks that incorporate equipment such as multiplexers and pair gain apparatus between the central office and the subscriber, or other DAML-type systems. The present invention provides an improved system which overcomes the known disadvantages of the prior art as discussed above and provides transmission throughput substantially at the rated symbol rates of 56k pulse amplitude modulation modems.

There is thus provided in accordance with a preferred embodiment of the present invention a telecommunications system including an at least partially digital telephone link having an analog end portion, first and second modems disposed along the link, and analog/digital devices disposed along the link intermediate the modems which are operative to support communications between the first and second modems substantially at bit rates in excess of 28.8 Kbps.

Further in accordance with a preferred embodiment of the present invention the system further includes an analog signal interface operative to receive an analog signal representation of digital data from a transmission source associated with one of the modems, the analog signal having been prepared at a first codec, a clock interface operative to receive clock timing information of the first codec, a second codec operative to convert the analog signal for digital transmission, digital transmission apparatus operative to digitally transmit the converted signal and the clock timing information, a digital signal interface operative to receive the converted signal and the clock timing information, and a third codec operative to reconvert the converted signal to an analog form, characterized in that the third codec is operative to reconvert in clock-synchronicity with the first codec in accordance with the clock timing information.

Still further in accordance with a preferred embodiment of the present invention the second and third codecs are operative to perform linear conversion.

Additionally in accordance with a preferred embodiment of the present invention the second and third codecs are operative to perform μ-Law companding.

Moreover in accordance with a preferred embodiment of the present invention the second and third codecs are operative to perform a-Law companding.

Further in accordance with a preferred embodiment of the present invention the second and third codecs are operative to perform sampling at a clock rate greater than the clock rate used by the first codec.

Still further in accordance with a preferred embodiment of the present invention the system further includes an analog signal interface operative to receive an analog signal representation of digital data from a transmission source associated with one of the modems, a first codec operative to convert the analog signal for digital transmission, digital transmission apparatus operative to digitally transmit the converted signal, a digital signal interface operative to receive the converted signal, and a second codec operative to reconvert the converted signal to an analog form, characterized in that the first codec is operative to convert using linear conversion at a bit resolution greater than the bit resolution of the analog signal, and the second codec is operative to reconvert using linear conversion.

Additionally in accordance with a preferred embodiment of the present invention the system further includes an analog signal interface operative to receive an analog signal representation of digital data from a transmission source associated with one of the modems, the analog signal having been prepared at a first codec, and a second codec operative to convert the analog signal for digital transmission, characterized in that the second codec is operative to sample the analog signal at a clock rate greater than the clock rate used by the first codec.

Moreover in accordance with a preferred embodiment of the present invention the system further includes digital transmission apparatus operative to digitally transmit the converted signal, a digital signal interface operative to receive the converted signal, and a third codec operative to reconvert the converted signal to an analog form.

Further in accordance with a preferred embodiment of the present invention the system further includes an analog signal interface operative to receive an analog signal representation of digital data from a transmission source associated with one of the first and second modems, a codec and a third modem, both arranged to receive the analog signal in parallel, a processor operative to receive digitized data from the third modem and provide the digitized data to a fourth modem, a selector operative to receive digitized data from either of the codec and the fourth modem, and digital transmission apparatus operative to digitally transmit the digitized data received from the selector, the selector selectively provides the digitized data to the digital transmission apparatus based on at least one predefined selection criterion.

Still further in accordance with a preferred embodiment of the present invention the selector is operative to selectively provide either of the digitized data received from the codec based on the absence of a modem training signal received at the third modem, and the digitized data received from the fourth modem based on the detection of a modem training signal received at the third modem.

Additionally in accordance with a preferred embodiment of the present invention the system further includes a buffer operative to buffer the digital data received from the third modem.

Moreover in accordance with a preferred embodiment of the present invention the processor is operative to operate both of the third and fourth modems at the same connection speed.

Further in accordance with a preferred embodiment of the present invention the system further includes an analog signal interface operative to receive an analog signal representation of digital data from a transmission source associated with one of the modems, a first codec operative to convert the analog signal to digital data form, a DSP filter operative to filter the digital data, digital transmission apparatus operative to digitally transmit the filtered signal, a digital signal interface operative to receive the filtered signal, and a second codec operative to reconvert the filtered signal to an analog form, characterized in that the DSP filter is operative to filter sufficiently to compensate for a combined frequency response between the converting and reconverting steps such that the frequency response is flatter and has a wider passband than the frequency response shown in FIG. 5.

Still further in accordance with a preferred embodiment of the present invention the system further includes a first digital signal interface operative to receive a digital signal representation of digital data from a transmission source associated with one of the modems and extract clock timing information from the digital signal, digital transmission apparatus operative to digitally transmit the digital signal and the clock timing information, a second digital signal interface operative to receive the digital signal and the clock timing information, and a codec operative to convert the digital signal to an analog form, characterized in that the codec converts in clock-synchronicity in accordance with the clock timing information.

Additionally in accordance with a preferred embodiment of the present invention the codec converts using a synchronous low jitter sampling clock.

There is also provided in accordance with a preferred embodiment of the present invention a telecommunications method including providing an at least partially digital telephone link having an analog end portion, disposing first and second modems along the link, and operating analog/digital devices along the link intermediate the modems to support communications between the first and second modems substantially at bit rates in excess of 28.8 Kbps.

There is al so provided in accordance with a preferred embodiment of the present invention a telecommunications method including receiving an analog signal representation of digital data from a transmission source, converting the analog signal for digital transmission, digitally transmitting the converted signal, receiving the converted signal, and reconverting the converted signal to an analog form, characterized in that the converting step includes converting using linear conversion at a bit resolution greater than or equal to the bit resolution of the analog signal, and the reconverting step reconverts using linear conversion.

There is also provided in accordance with a preferred embodiment of the present invention a telecommunications method including receiving an analog signal representation of digital data from a transmission source, the analog signal having been prepared at a first codec, and converting the analog signal for digital transmission, characterized in that the converting step includes sampling the analog signal at a clock rate greater than the clock rate used by the first. codec.

Further in accordance with a preferred embodiment of the present invention both of the clock rates exceed 8 kilohertz.

Still further in accordance with a preferred embodiment of the present invention the method further includes digitally transmitting the converted signal, receiving the converted signal, and reconverting the converted signal to an analog form.

There is also provided in accordance with a preferred embodiment of the present invention a telecommunications method including receiving an analog signal representation of digital data from a transmission source, providing the analog signal to either of a codec and a first modem, providing a processor operative to receive digitized data from the first modem and provide the digitized data to a second modem, providing a selector operative to receive digitized data from either of the codec and the second modem, and selectively digitally transmitting the digitized data received from one of the codec and the second modem based on at least one predefined selection criterion.

Further in accordance with a preferred embodiment of the present invention the selectively digitally transmitting step includes selectively digitally transmitting the digitized data received from the codec based on the absence of a modem training signal received at the first modem and selectively digitally transmitting the digitized data received from the second modem based on the detection of a modem training signal received at the first modem.

Still further in accordance with a preferred embodiment of the present invention the method further includes buffering the digital data received from the first modem.

Additionally in accordance with a preferred embodiment of the present invention the method further includes operating both of the modems at the same connection speed.

There is also provided in accordance with a preferred embodiment of the present invention a telecommunications method including receiving an analog signal representation of digital data from a transmission source, converting the analog signal to digital data form, DSP-filtering the digital data, digitally transmitting the filtered signal, receiving the filtered signal, and reconverting the filtered signal to an analog form, characterized in that the DSP-filtering step includes filtering to sufficiently compensate for a combined frequency response between the converting and reconverting steps such that the frequency response is flatter and has a wider passband than the frequency response shown in FIG. 5.

There is also provided in accordance with a preferred embodiment of the present invention a telecommunications method including (a) receiving a digital signal representation of digital data from a digital transmission source, (b) extracting clock timing information from the digital signal, (c) digitally transmitting the digital signal and the clock timing information, (d) receiving the digital signal and the clock timing information, and (e) converting the digital signal to an analog form, characterized in that the converting step (e) includes converting at a codec that is in clock-synchronicity in accordance with the clock timing information.

Further in accordance with a preferred embodiment of the present invention the method further includes prior to the receiving step (a) (f) receiving an analog signal representation of the digital data of the receiving step (a) from an analog transmission source, the analog signal having been prepared at a first codec, (g) receiving clock timing information of the first codec, (h) converting the analog signal into the digital signal representation of the digital data of the receiving step (a) for digital transmission, and (i) digitally transmitting the converted signal and the clock timing information.

Still further in accordance with a preferred embodiment of the present invention the converting step (h) includes converting using linear conversion.

Additionally in accordance with a preferred embodiment of the present invention the converting step (h) includes converting using $\mu$-Law companding.

Moreover in accordance with a preferred embodiment of the present invention the converting step (h) includes converting using a-Law companding.

Further in accordance with a preferred embodiment of the present invention the converting step (h) includes sampling at a clock rate greater than the clock rate used by the first codec.

Still further in accordance with a preferred embodiment of the present invention the converting step (e) includes converting using a synchronous low jitter sampling clock.

There is also provided in accordance with a preferred embodiment of the present invention a telecommunications system including an analog signal interface operative to receive an analog signal representation of digital data from a transmission source, a first codec operative to convert the analog signal for digital transmission, digital transmission apparatus operative to digitally transmit the converted signal, a digital signal interface operative to receive the converted signal, and a second codec operative to reconvert the converted signal to an analog form, characterized in that the first codec is operative to convert using linear conversion at a bit resolution greater than the bit resolution of the analog signal, and the second codec is operative to reconvert using linear conversion.

Further in accordance with a preferred embodiment of the present invention the codecs operate at a resolution of at least 12 bits.

Still further in accordance with a preferred embodiment of the present invention the codecs operate at a resolution more than 12 bits.

Additionally in accordance with a preferred embodiment of the present invention the codecs operate at a resolution of 16 bits.

Moreover in accordance with a preferred embodiment of the present invention the codecs are operative to perform $\mu$-Law companding.

Further in accordance with a preferred embodiment of the present invention the codecs are operative to perform a-Law companding.

There is also provided in accordance with a preferred embodiment of the present invention telecommunications apparatus including an analog signal interface operative to receive an analog signal representation of digital data from a transmission source, the analog signal having been prepared at a first codec, and a second codec operative to convert the analog signal for digital transmission, characterized in that the second codec is operative to sample the analog signal at a clock rate greater than the clock rate used by the first codec.

Further in accordance with a preferred embodiment of the present invention the codecs operate at a sampling rate exceeding 8 kilohertz.

Still further in accordance with a preferred embodiment of the present invention the codecs are operative to perform linear conversion.

Additionally in accordance with a preferred embodiment of the present invention the codecs are operative to perform $\mu$-Law companding.

Moreover in accordance with a preferred embodiment of the present invention the codecs are operative to perform a-Law companding.

Further in accordance with a preferred embodiment of the present invention digital transmission apparatus is further included operative to digitally transmit the converted signal, a digital signal interface operative to receive the converted signal, and a third codec operative to reconvert the converted signal to an analog form.

There is also provided in accordance with a preferred embodiment of the present invention Telecommunications apparatus including an analog signal interface operative to receive an analog signal representation of digital data from a transmission source, a codec and a first modem, both arranged to receive the analog signal in parallel, a processor operative to receive digitized data from the first modem and provide the digitized data to a second modem, a selector operative to receive digitized data from either of the codec and the second modem, and digital transmission apparatus operative to digitally transmit the digitized data received from the selector, the selector selectively provides the digitized data to the digital transmission apparatus based on at least one predefined selection criterion.

Further in accordance with a preferred embodiment of the present invention the selector is operative to selectively provide either of the digitized data received from the codec based on the absence of a modem training signal received at the first modem, and the digitized data received from the second modem based on the detection of a modem training signal received at the first modem.

Still further in accordance with a preferred embodiment of the present invention a buffer is further included operative to buffer the digital data received from the first modem.

Additionally in accordance with a preferred embodiment of the present invention the processor is operative to operate both of the modems at the same connection speed.

There is also provided in accordance with a preferred embodiment of the present invention a telecommunications system including an analog signal interface operative to receive an analog signal representation of digital data from a transmission source, a first codec operative to convert the analog signal to digital data form, a DSP filter operative to filter the digital data, digital transmission apparatus operative to digitally transmit the filtered signal, a digital signal interface operative to receive the filtered signal, and a second codec operative to reconvert the filtered signal to an analog form, characterized in that the DSP filter is operative to filter sufficiently to compensate for a combined frequency response of the digital transmission such that the frequency response is flatter and has a wider passband than the frequency response shown in FIG. 5.

There is also provided in accordance with a preferred embodiment of the present invention a telecommunications system including a first digital signal interface operative to receive a digital signal representation of digital data from a digital transmission source and extract clock timing information from the digital signal, digital transmission apparatus operative to digitally transmit the digital signal and the clock timing information, a second digital signal interface operative to receive the digital signal and the clock timing information, and a third codec operative to convert the digital signal to an analog form, characterized in that the third codec converts in clock-synchronicity in accordance with the clock timing information.

Further in accordance with a preferred embodiment of the present invention the system further includes an analog signal interface operative to receive an analog signal representation of the digital data from an analog transmission source, the analog signal having been prepared at a first codec, a clock interface operative to receive clock timing information of the first codec, a second codec operative to convert the analog signal for digital transmission, and digital transmission apparatus operative to digitally transmit the converted signal and the clock timing information.

Still further in accordance with a preferred embodiment of the present invention the codec is operative to perform linear conversion.

Additionally in accordance with a preferred embodiment of the present invention the codec is operative to perform $\mu$-Law companding.

Moreover in accordance with a preferred embodiment of the present invention the codec is operative to perform a-Law companding.

Further in accordance with a preferred embodiment of the present invention the codec is operative to perform sampling at a clock rate greater than the clock rate used to prepare the digital signal representation of digital data.

Still further in accordance with a preferred embodiment of the present invention the codec converts using a synchronous low jitter sampling clock.

There is also provided in accordance with a preferred embodiment of the present invention Telecommunications apparatus including an analog signal interface operative to receive an analog signal representation of digital data from a transmission source, a first codec operative to convert the analog signal for digital transmission, and digital transmission apparatus operative to digitally transmit the converted signal, characterized in that the first codec is operative to convert using linear conversion at a bit resolution greater than the bit resolution of the analog signal.

There is also provided in accordance with a preferred embodiment of the present invention Telecommunications apparatus including a digital signal interface operative to receive a digital signal representation of an analog signal representation of digital data from a transmission source, the digital signal representation having been converted using linear conversion at a bit resolution greater than or equal to the bit resolution of the analog signal, and a codec operative to reconvert the converted signal to an analog form using linear conversion.

There is also provided in accordance with a preferred embodiment of the present invention Telecommunications apparatus including an analog signal interface operative to receive an analog signal representation of digital data from a transmission source, a codec operative to convert the analog signal to digital data form, a DSP filter operative to filter the digital data, and digital transmission apparatus operative to digitally transmit the filtered signal, characterized in that the DSP filter is operative to filter sufficiently to compensate for a combined frequency response of the digital transmission such that the frequency response is flatter and has a wider passband than the frequency response shown in FIG. 5.

It is noted that throughout the specification and claims the terms "end-user" and "subscriber" are used interchangeably.

It is also noted that throughout the specification and claims the terms "local exchange" and "central office" are used interchangeably. It is also noted that throughout the specification and claims the terms "CODEC" and "analog/digital device" are used interchangeably.

BRIEF DESCRIPTION OF THE DRAWINGS

The present invention will be understood and appreciated from the following detailed description, taken in conjunction with the drawings in which:

FIGS. 2A and 2B, taken together, are simplified block diagrams illustrating downstream and upstream views respectively of a central office terminal constructed and operative in accordance with another preferred embodiment of the present invention;

| ISP | Internet Service Provider |
|---|---|
| COT | Central Office Terminal |
| CO | Central Office |
| DSL | Digital Subscriber Line |
| DSP | Digital Signal Processing/Processor |
| LE | Local Exchange |
| Kbps | Kilobits per second |
| CODEC | CODer DECoder |
| PLL | Phase Locked Loop |
| PCM | Pulse Code Modulation |
| RT | Remote Terminal |
| SLIC | Subscriber Line Interface Circuit |
| ELIC | Exchange Line Interface Circuit |
| POTS | Plain Old Telephony Service |
| DAML | Digital Added Main Line |

DETAILED DESCRIPTION OF PREFERRED EMBODIMENTS

Figure 1:
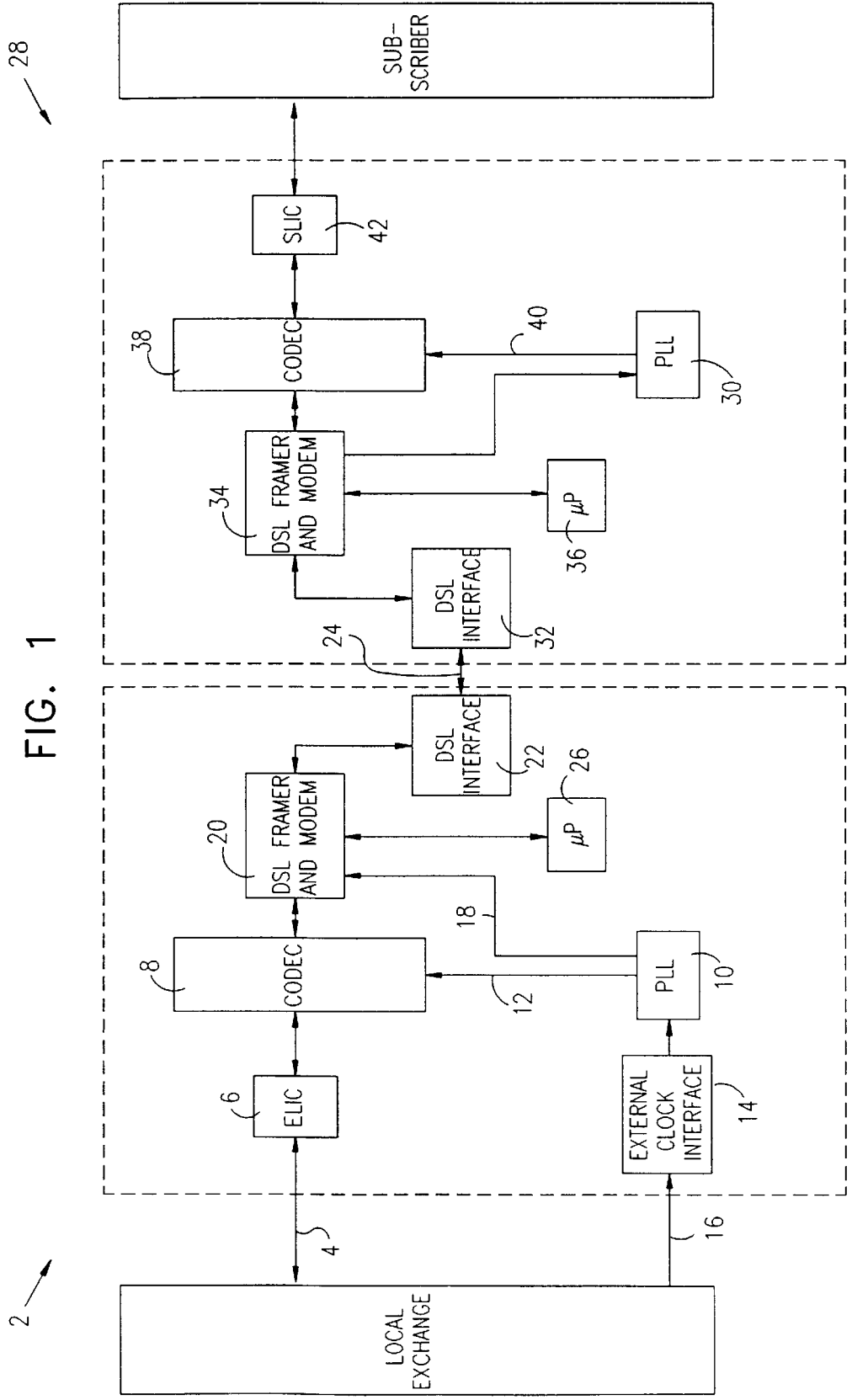
FIG. 1 is a simplified block diagram of digital telephony system constructed and operative in accordance with a prefered embodiment of the present invention.

Reference is now made to FIG. 1 which is a simplified block diagram of a digital telephony system constructed and operative in accordance with a preferred embodiment of the present invention. FIG. 1 shows an analog signal arriving from a first terminus having pulse amplitude modulation modem capability, referred to herein as a local exchange, typically at a central office terminal (COT) generally designated 2, over a connection 4, typically a copper wire twisted pair, to an exchange line interface circuit (ELIC) 6. Although not particularly shown in FIG. 1, ELIC 6 typically includes signaling functionality, such as may be implemented using a ring detector, a battery reversal detector, and an off hook hold circuit as are well known. ELIC 6 preferably performs a two to four wire hybrid function and prevents outgoing analog signals from leaking into incoming analog signals.

A CODEC 8, such as a Siemens PEB 2266, is provided, preferably capable of performing echo cancellation, transhybrid adaptation and impedance matching using DSP techniques. CODEC 8 typically performs A-Law or μ-Law companding in accordance with local or national telephony standards and regulations. CODEC 8 preferably receives its sampling clock from PLL 10 via a clock line 12. The clock frequency on clock line 12 preferably provides for an 8 KHz sampling frequency to CODEC 8 in accordance with telephony standards. This sampling frequency is preferably synchronized to the LE's line card CODEC sampling frequency. The clock frequency on clock line 12 is synthesized by PLL 10 and is synchronized to the clock received from the LE at an external clock interface 14 via a clock line 16 which may be a transformer including a known configuration of protection diodes and buffers.

PLL 10 also preferably provides a synchronous clock frequency via a clock line 18 to a DSL framer/modem 20, such as a Rockwell 8954 and 8970, which encodes the timing information and transmits it via a DSL interface 22 over a connection 24, also typically a copper wire twisted pair, to a remote terminal (RT) generally designated 28. DSL framer 20 is typically controlled by a microprocessor 26, such as an Intel 80C32.

RT 28 preferably includes a PLL 30, such as a Phillips 74HCT7046, which recovers the timing information arriving via connection 24, a DSL interface 32, and a DSL framer/modem 34, such as a Rockwell 8954 and 8970, controlled by a microprocessor 36, such as Intel 80C32. PLL 30 preferably synthesizes a clock frequency synchronized to the local exchange clock from the timing information. PLL 30 then may provide a synchronous sampling clock to a CODEC 38, such as a Siemens PEB 2266, via a clock line 40 for eventual downstream transmission via a subscriber line interface circuit (SLIC) 42, such as an AMD 7949, to a second terminus also having pulse amplitude modulation modem capability, referred to herein as a subscriber. The clock synchronization provided in this manner between the CO, the COT, and the RT thus reduces the quantization error of the analog signal sampled at the COT and reproduced at the RT.

In another embodiment CODEC 8, such as a Siemens PEB 2266, may use linear conversion rather than A-Law or μ-Law companding. Since 8-bit PCM companding provides roughly the same information as 12 bits in linear conversion, more than 12 bits, and preferably 16 bits, are transmitted to the RT for each element being sampled. The CODEC in the RT, such as a Siemens PEB 2266, also operates in linear mode for reconversion. Linear conversion may be used in combination with or instead of LE-COT-RT clock synchronization as described hereinabove.

In still another embodiment PLL 10 may provide a clock frequency, such as 9.6 KHz, to CODEC 8 that is higher than the clock frequency used by the LE CODEC, i.e., higher than 8 KHz. The oversampled and encoded signal may then be transmitted to the RT for reconversion to an analog signal using the clock which it receives from COT 2 as described hereinabove. Oversampling may also be used in combination with linear conversion, as well as in combination with or instead of LE-COT-RT clock synchronization as described hereinabove.

Figure 2B:
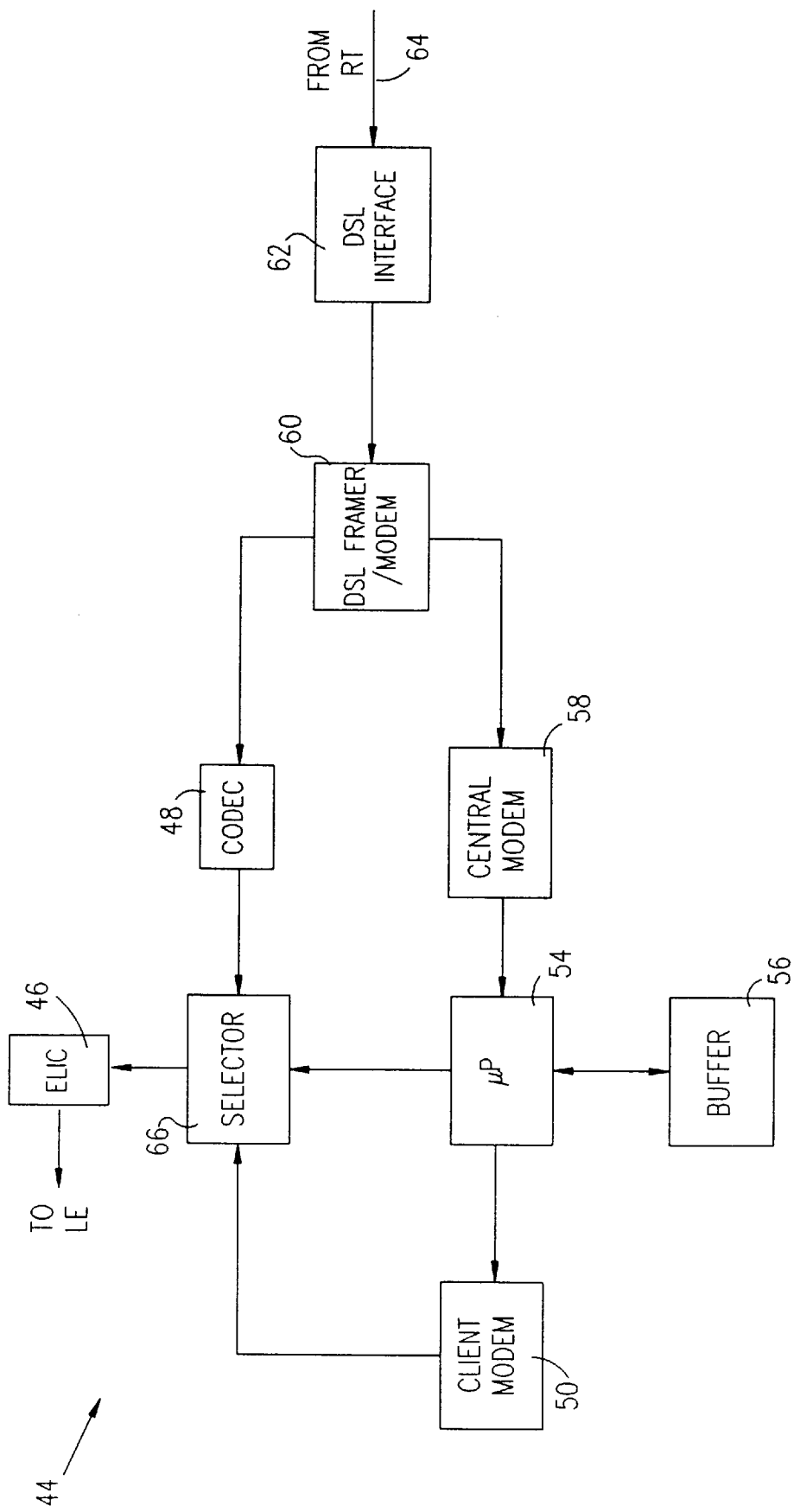

FIGS. 2A and 2B, taken together, are simplified block diagrams illustrating downstream and upstream views respectively of a central office terminal 44 constructed and operative in accordance with another preferred embodiment of the present invention. FIG. 2A shows a downstream analog signal arriving from the LE at an ELIC 46. From ELIC 46 the signal preferably propagates to both a CODEC 48, such as a Siemens PEB 2266, and a client modem 50, such as a Rockwell RCDL56ACFLW chip set. Client modem 50 is preferably capable of receiving high-speed transmissions at 56 Kbps. CODEC 48 performs and A/D conversion of the signal, preferably using Pulse Code Modulation (PCM) A-Law or μ-Law companding. The digitized PCM data is then transmitted to a selector 52.

Client modem 50 extracts the digital data from the analog signal received from ELIC 46, behaving much like an end user modem would, and provides the digital data to a microprocessor 54, such as an Intel 80C32, which may store the data in a buffer 56. The data may then be extracted from buffer 56 and sent by microprocessor 54 to a central modem 58, such as a Rockwell R56CSM chip set. Central modem 58 is preferably capable of transmitting high-speed transmissions at 56 Kbps. Central modem 58 preferably modulates the data using a pulse amplitude modulation scheme and transmits digital PCM codes to the selector 52.

COT 44 is typically configured to operate in either of two modes: "normal" and "modem." Microprocessor 54 monitors client modem 50 for an indication whether a high speed modem training signal is detected when the analog signal is received from the LE. If such a signal is detected microprocessor 54 switches selector 52 to "modem" mode. If no such a signal is detected microprocessor 54 switches selector 52 to "normal" mode.

In "normal" mode selector 52 passes the digitized data received from CODEC 48 to a DSL framer/modem 60 which performs the relevant modulation, such as 2B1Q, and transmits it via a DSL interface 62 over a connection 64, typically a copper wire twisted pair, to an RT which preferably operates in a manner that is generally consistent with the operation of RT 28 described hereinabove with reference to FIG. 1.

In "modem" mode selector 52 passes the digitized data received from central modem 58 to DSL framer/modem 60 which modulates and transmits via DSL interface 62 over connection 64 to the RT which preferably operates in a manner that is generally consistent with the operation of RT 28 described hereinabove with reference to FIG. 1.

FIG. 2B shows an upstream view of COT 44. An upstream digital signal is received from the RT at DSL interface 62 and DSL framer/modem 60 where it is preferably passed in parallel to both CODEC 48 and central modem 58. CODEC 48 performs a D/A conversion and passes the signal to a selector 66. Central modem 58 extracts the data from the signal and passes it to microprocessor 54 which may store it in buffer 56. The data is then retrieved from buffer 56 by microprocessor 54 and passed to client modem 50 which modulates the data and transmits it in analog format to selector 66.

Selector 66 is switched to either of "normal" and "modem" modes by microprocessor 54 in the same manner as described above with reference to selector 52. Depending on its current mode, selector 66 transmits either the analog signal received from CODEC 48 or from client modem 50 to the LE via ELIC 46.

To avoid data overrun or underrun, microprocessor 54 preferably controls the connection speeds of both client modem 50 and central modem 58 and forces both modem sessions, one between an upstream modem and client modem 50 and the other between central modem 58 and the subscriber modem, to the same speed. Speed adjustment fluctuations may be absorbed by buffer 56.

Figure 3:
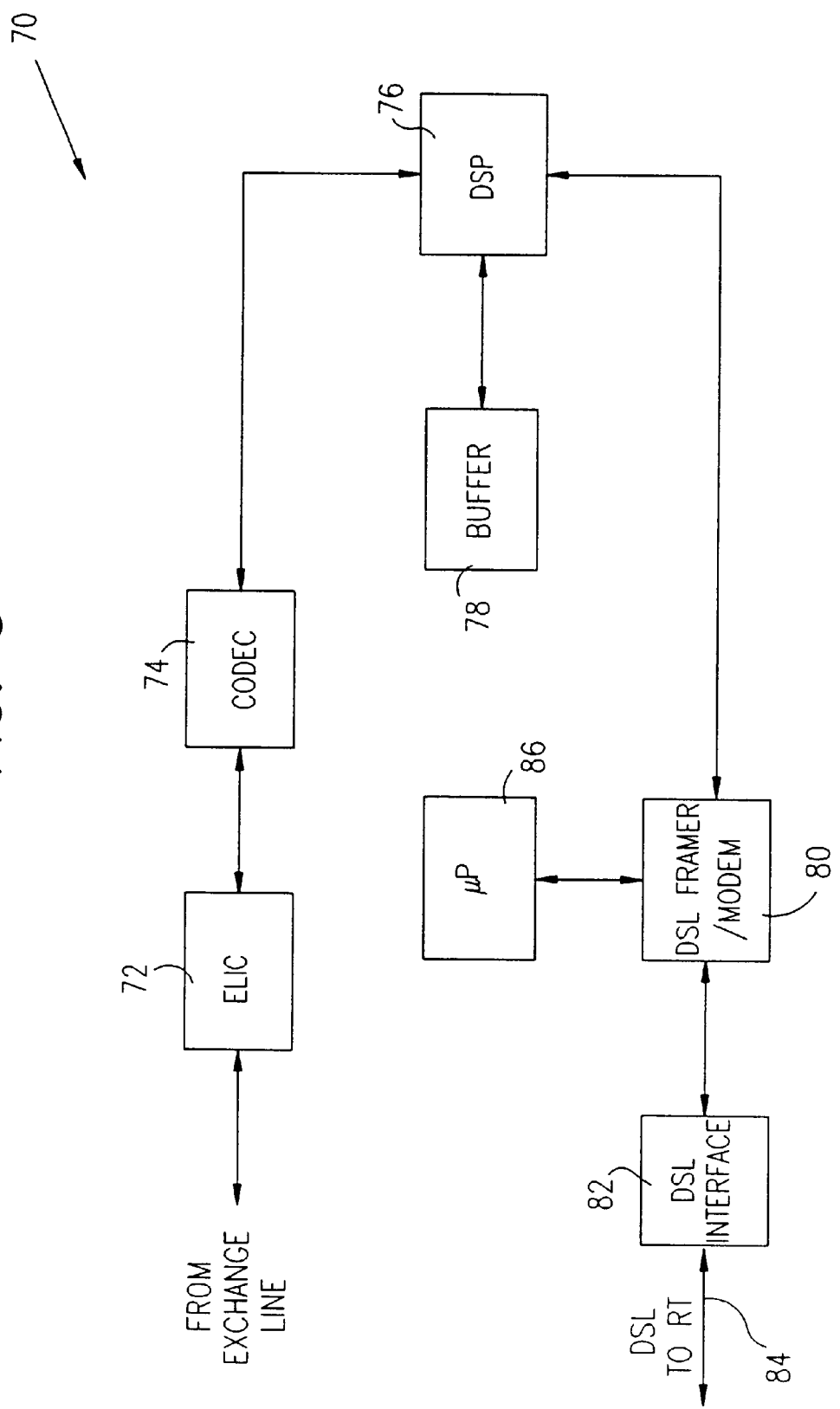
FIG. 3 is a simplified block diagram of a central office terminal constructed and operative in accordanc with another preferred embodiment of the present invention.

Reference is now made to FIG. 3 which is a simplified block diagram of a central office terminal 70 central office terminal 70 constructed and operative in accordance with another preferred embodiment of the present invention. FIG. 3 shows an analog signal arriving from the LE at an ELIC 72 which passes the signal to a CODEC 74, such as a Siemens PEB 2266. CODEC 74 preferably operates in linear mode. The sampling clock frequency of CODEC 74 preferably provides for oversampling relative to standard telephony sampling frequency of 8 KHz, such as a sampling frequency of 16 KHz. This oversampling frequency may be increased or decreased according to the quality of the signal arriving from the LE. The sampling clock for CODEC 74 is typically generated by a free-running oscillator (not shown).

Figure 5:
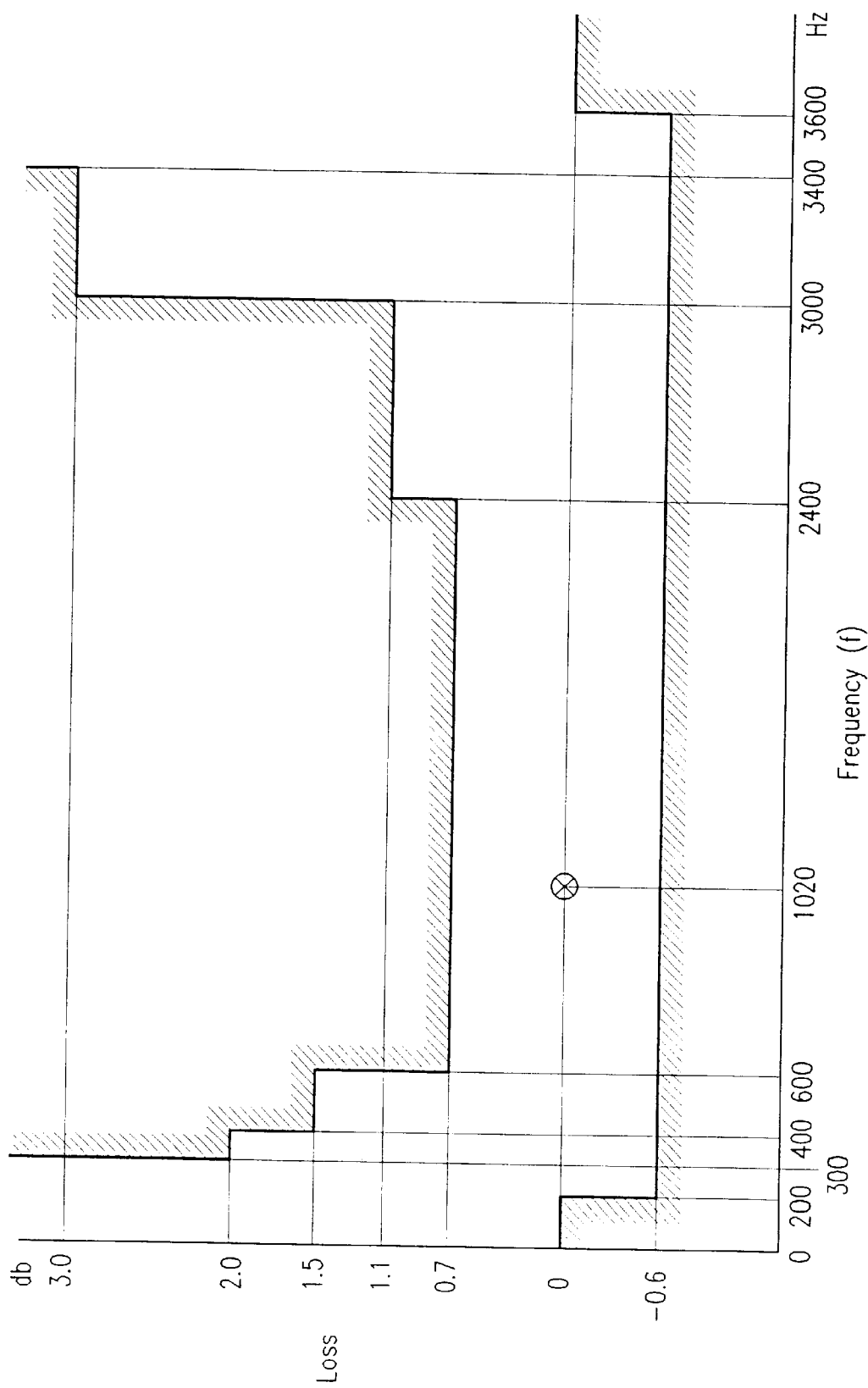
FIG. 5 is a graphical illustration of the recommended frequency response in accordance with ITU-T G.712FIG. 3/G.712.

The digital data from CODEC 74 is transmitted to a DSP 76, such as a Texas Instruments 320C548. DSP 76 preferably performs filtering on the incoming signal to sufficiently compensate for the ELIC 72 and RT combined frequency response so that the COT to RT frequency response is flatter and has a wider passband that the frequency response recommended by ITU-T G.712 FIG. 3/G.712 as shown in FIG. 5. The COT to RT frequency response is preferably as flat as possible within the passband, preferably within frequencies used by voiceband modems, such as with a −3 dB bandwidth between 150 Hz and 4 Khz. A buffer 78 may be used by DSP 76 for storage of sampled data and intermediate calculations. The data generated by DSP 76 after the above mentioned filtering is transmitted in linear or PCM code to a DSL framer/modem 80, such as a Rockwell 8954 and 8970, typically controlled by a microprocessor 86, such as an Intel 80C32. DSL framer/modem 80 then modulates and transmits the data, typically 2B1Q-coded, to a DSL interface 82 for transmission via a connection 84, typically a copper wire twisted pair 16, to an RT such as RT 28 (FIG. 2). The RT CODEC, such as a Siemens PEB 2266, operates in linear or PCM mode and supports any oversampling in accordance with DSP 76.

Figure 4:
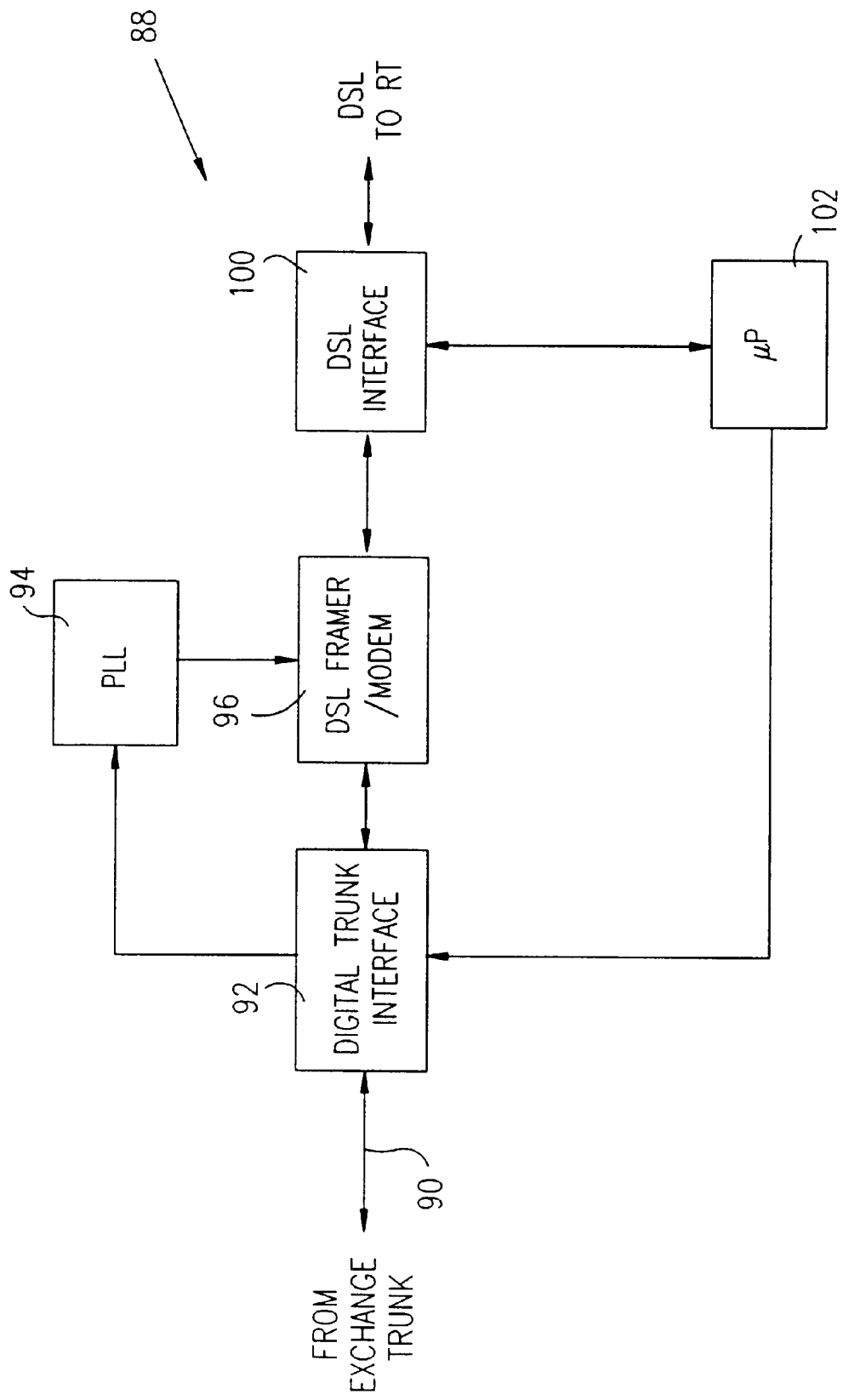
FIG. 4 is a simplified block diagram of a central office terminal constructed and operative in accordance with another preferred embodiment of the present invention.

Reference is now made to FIG. 4 which is a simplified block diagram of a central office terminal 88 constructed and operative in accordance with another preferred embodiment of the present invention. The embodiment of FIG. 4 replaces the analog connection between the LE and the COT with a digital connection 90. COT 88 communicates with the LE's multiplexed digital trunk via a digital trunk interface 92. A PLL 94, such as a Mitel 8941, is provided for receiving the LE clock and providing the clock to a DSL framer/modem 96 for transmission to an RT, such as RT 28 (FIG. 1) which synchronizes to the LE clock as described hereinabove with reference to PLL 30 (FIG. 1), such as a Phillips 74HCT7046, and reconstructs the analog signal for transmission to the end user with high stability.

Digital trunk interface 92 typically includes a clock extraction unit, and a framer, such as a Dallas Semiconductor 2154. The digital signal is typically PCM-multiplexed and is injected into DSL framer/modem 96 which is clocked using the clock received from PLL 94. PLL 94 is preferably synchronized to the LE digital trunk clock received via digital trunk interface 92. From DSL framer/modem 96 the digital data is transmitted to the RT via a DSL interface 100. A microprocessor 102, such as an Intel 80C188, is typically provided to control DSL framer/modem 96 and convert the signaling at digital trunk interface 92 from digital trunk format to analog trunk format and vice versa.

RT PLL 30 (FIG. 1) may also provide a synchronous low jitter sampling clock to CODEC 38 (FIG. 1) resulting in reduced quantization error and noise in the analog signal received at the end user.

It is appreciated that any of the embodiments described hereinabove with reference to FIGS. 1–4 may additionally incorporate features to provide signal training using known techniques to analyze connection interference resulting in transmission distortion. Filters may then be used to control the overall signal based on known connection interference characteristics. Training may be performed periodically based on elapsed time between training sessions or each time a connection is established. Training may be performed proactively where the training session is initiated by the transmitting end off-line, when no data or voice connection has been established, or on-line when a connection has been established. In proactive training a training signal is sent toward the external connection and the performance of the return signal is studied. Training may also be performed passively by the transmitting end, either off-line or on-line, where the training session is initiated by any external system connected to the transmitter, such as a modem.

It is appreciated that any apparatus described herein in the context of a system may be provided separately. For example, central office terminal (COT) generally designated 2 (FIG. 1) may be provided separately from remote terminal (RT) generally designated 28 (FIG. 1), downstream elements of central office terminal 44 (FIG. 2A) may be provided separately from upstream elements of central office terminal 44 (FIG. 2B), and central office terminal 70 (FIG. 3) and central office terminal 88 (FIG. 4) may each be provided separately from remote terminal 28 (FIG. 1).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

We claim:

1. A telecommunications system comprising:
    an at least partially digital telephone link having an analog end portion;
    first and second modems disposed along the link; and
    analog/digital devices disposed along the link intermediate the modems which are operative to support communications between said first and second modems substantially at bit rates in excess of 28.8 Kbps;
    an analog signal interface operative to receive an analog signal representation of digital data from a transmission source associated with one of said first and second modems;
    a codec and a third modem, both arranged to receive said analog signal in parallel;
    a processor operative to receive digitized data from said third modem and provide said digitized data to a fourth modem;
    a selector operative to receive digitized data from either of said codec and said fourth modem and is operative to selectively provide either of:
        said digitized data received from said codec based on the absence of a modem training signal received at said third modem; and
        said digitized data received from said fourth modem based on the detection of a modem training signal received at said third modem; and
    digital transmission apparatus operative to digitally transmit said digitized data received from said selector, wherein said selector selectively provides said digitized data to said digital transmission apparatus based on at least one predefined selection criterion.

2. A telecommunications method comprising:

receiving an analog signal representation of digital data from a transmission source;

providing said analog signal to either of a codec and a first modem;

providing a processor operative to receive digitized data from said first modem and provide said digitized data to a second modem;

providing a selector operative to receive digitized data from either of said codec and said second modem; and selectively digitally transmitting said digitized data received from one of said codec and said second modem based on at least one predefined selection criterion, wherein said selectively digitally transmitting step comprises selectively digitally transmitting said digitized data received from said codec based on the absence of a modem training signal received at said first modem and selectively digitally transmitting said digitized data received from said second modem based on the detection of a modem training signal received at said first modem.

3. Telecommunications apparatus comprising:

an analog signal interface operative to receive an analog signal representation of digital data from a transmission source;

a codec and a first modem, both arranged to receive said analog signal in parallel;

a processor operative to receive digitized data from said first modem and provide said digitized data to a second modem;

a selector operative to receive digitized data from either of said codec and said second modem, wherein said selector is operative to selectively provide either of:

said digitized data received from said codec based on the absence of a modem training signal received at said first modem; and said digitized data received from said second modem based on the detection of a modem training signal received at said first modem; and digital transmission apparatus operative to digitally transmit said digitized data received from said selector, wherein said selector selectively provides said digitized data to said digital transmission apparatus based on at least one predefined selection criterion.

4. A telecommunications system according to claim 1 and further comprising a buffer operative to buffer said digital data received from said third modem.

5. A telecommunications system according to claim 1 wherein said processor is operative to operate both of said third and fourth modems at the same connection speed.

6. A method according to claim 2 and further comprising buffering said digital data received from said first modem.

7. A method according to claim 2 and further comprising operating both of said modems at the same connection speed.

8. Telecommunications apparatus according to claim 3 and further comprising a buffer operative to buffer said digital data received from said first modem.

9. Telecommunications apparatus according to claim 3 wherein said processor is operative to operate both of said modems at the same connection speed.

* * * * *